(12) United States Patent
Lee (10) Patent No.: US 7,175,273 B2
(45) Date of Patent: Feb. 13, 2007

(54) EYEGLASSES HAVING LIGHT EMITTING FUNCTION

(76) Inventor: Ching-Hui Lee, No. 13, Kangtzuwei, Madou Township, Tainan County (TW)

( * ) Notice: Subject to any disclaimer, the term of this patent is extended or adjusted under 35 U.S.C. 154(b) by 0 days.

(21) Appl. No.: 11/052,988

(22) Filed: Feb. 9, 2005

(65) Prior Publication Data
US 2006/0176442 A1    Aug. 10, 2006

(51) Int. Cl.
*G02C 11/02*    (2006.01)
(52) U.S. Cl. ............... 351/51; 351/41; 351/158
(58) Field of Classification Search ............ 351/41, 351/51, 52, 158, 83, 103, 104, 111
See application file for complete search history.

(56) References Cited

U.S. PATENT DOCUMENTS 5,946,071 A * 8/1999 Feldman ................ 351/41
6,857,739 B1 * 2/2005 Watson ................ 351/158
2006/0007390 A1 * 1/2006 Lin ................ 351/158

FOREIGN PATENT DOCUMENTS

DE    3304347    * 8/1984    ............ 351/51

* cited by examiner

Primary Examiner—Huy Mai
(74) Attorney, Agent, or Firm—Rosenberg, Klein & Lee (57) ABSTRACT

A pair of eyeglasses includes a rim, two temples, and a light emitting device; the rim has a groove thereon while each of the temple has a groove thereon; the light emitting device has several light emitting elements positioned in the grooves of the rim and the temples, and it has a power supplying unit electrically connected to the light emitting elements for supplying power to make the light emitting elements shine; thus, the eyeglasses have light emitting function.

9 Claims, 8 Drawing Sheets

EYEGLASSES HAVING LIGHT EMITTING FUNCTION

BACKGROUND OF THE INVENTION

1. Field of the Invention

The present invention relates to a pair of eyeglasses having light emitting function, more particularly one, which has light emitting elements held in grooves on inner sides of the rim and temples thereof so that the eyeglasses will shine after the light emitting elements are switched on.

2. Brief Description of the Prior Art

Many types of eyeglasses are available for serving their respective purposes, e.g. to aid and correct defective sight, to match the clothing and make the wearer look more attractive, and to protect the eyes.

However, none of the conventional eyeglasses has other functions except for their respective major functions. Consequently, when it comes to eyeglasses, there don't seem to be many choices for people who like to buy and use fancy and multi-functional articles.

SUMMARY OF THE INVENTION

It is a main object of the invention to provide a pair of eyeglasses having light emitting function so that people have more choices.

The eyeglasses of the invention include a rim, two temples, and a light emitting device. The rim has a groove thereon while each of the temples has a groove thereon. The light emitting device has several light emitting elements positioned in the grooves of the rim and the temples, and it has a power supplying unit electrically connected to the light emitting elements for supplying power to the light emitting elements.

Transparent covers are respectively fitted in the grooves of the rim and the temples to cover the light emitting elements. Alternatively, the grooves of the rim and the temples are filled with transparent glue.

The light emitting elements can be EL luminescent sheets, EL luminescent wires or light emitting diodes. The light emitting device is preferably equipped with a circuit control unit, which has an exterior switch, and which is electrically connected to the light emitting elements and the power supplying unit, such that the user is allowed to make the light emitting elements shine continuously, and is allowed to make the light emitting elements flash repeatedly instead.

The power supplying unit and the circuit control unit of the light emitting device are preferably held in a shell outside the temples and the rim; thus, the power supplying unit, the switch, and the circuit control unit can be easily carried with the wearer of the eyeglasses.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
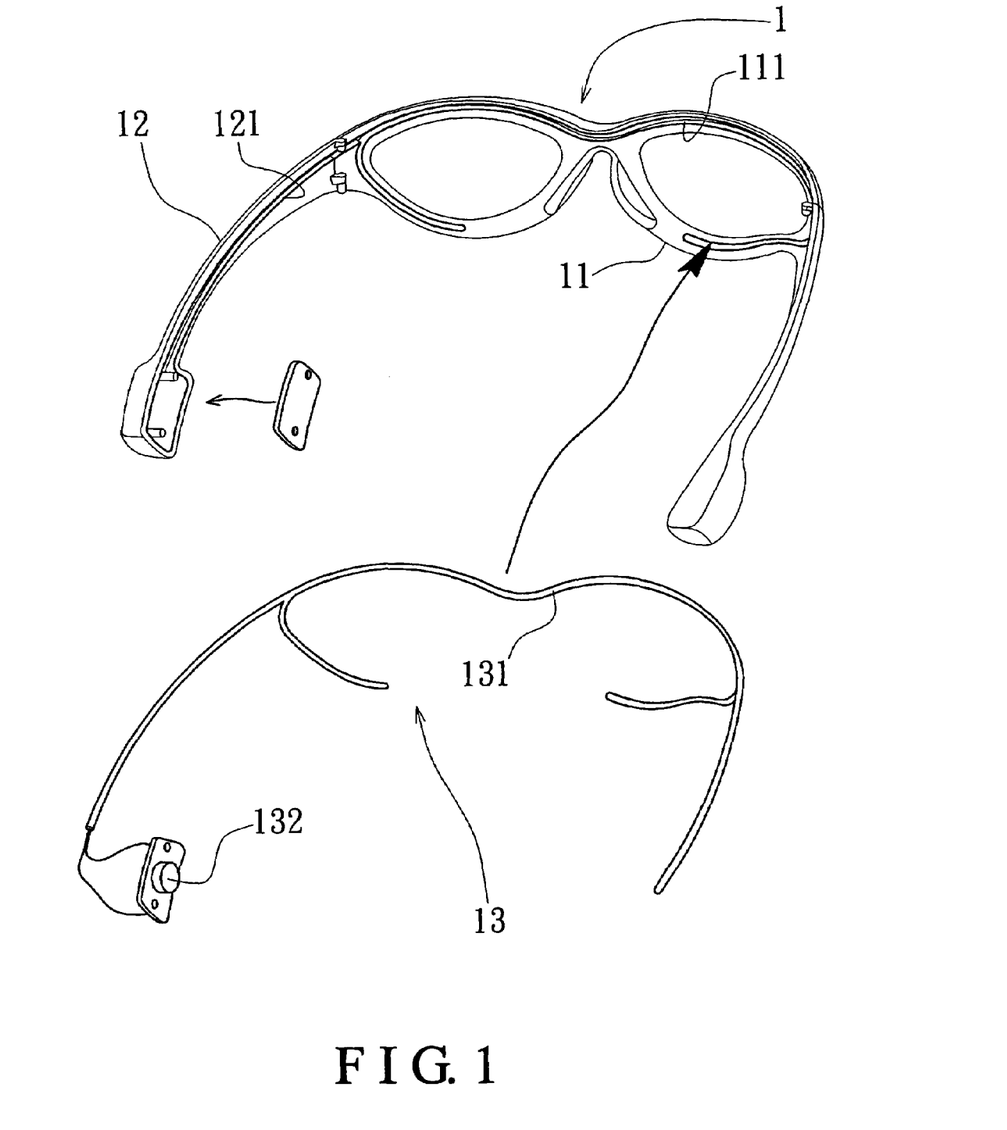
FIG. 1 is an exploded view of the first embodiment of a pair of eyeglasses having light emitting function in the present invention.
Figure 2:
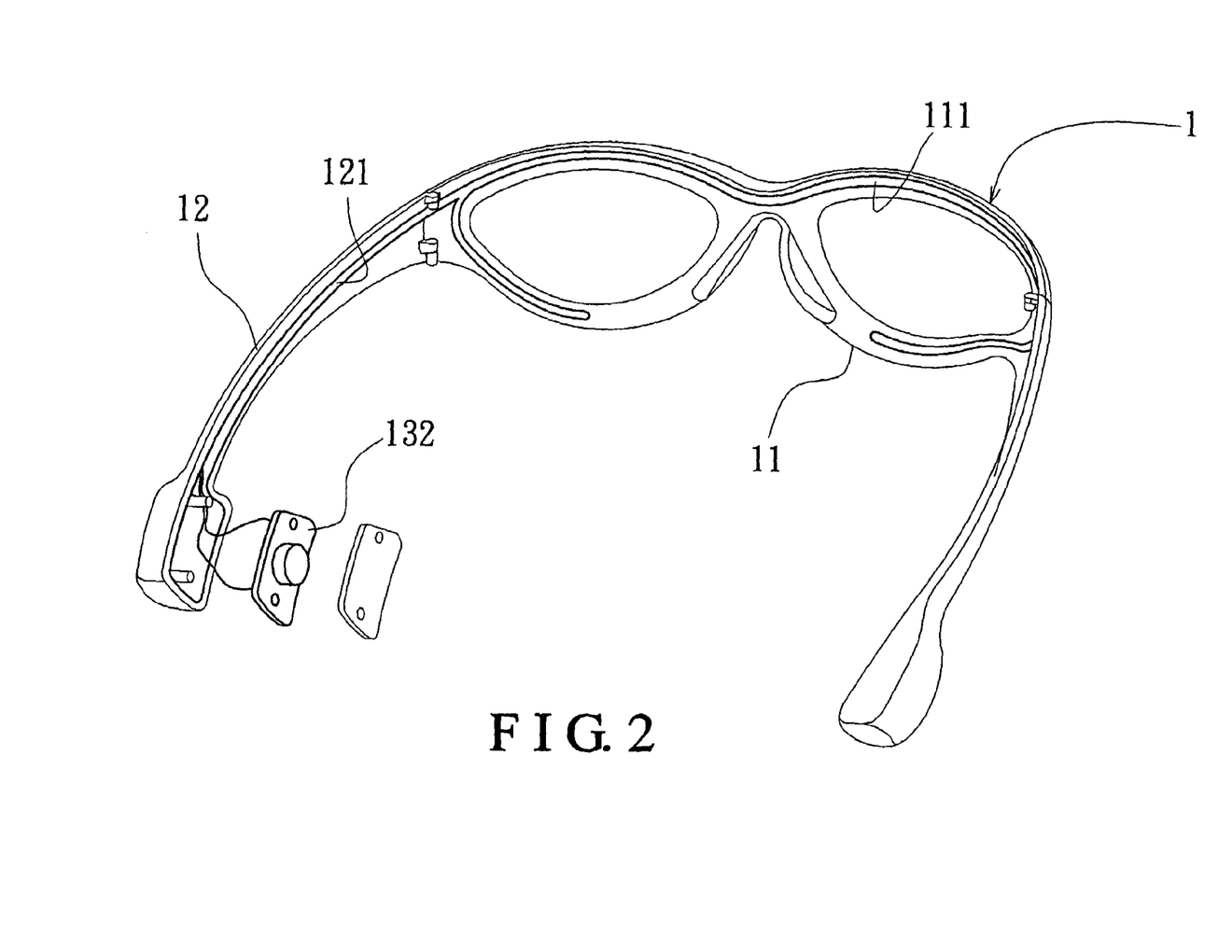
FIG. 2 is a view of the first embodiment in the present invention.

Referring to FIGS. 1 and 2, a first preferred embodiment 1 of a pair of eyeglasses having light emitting function includes a rim 11, two temples 12 pivoted to two ends of the rim 11, and a light emitting device 13.

The rim 11 has a groove 111 on a rear side thereof. And, each of the temples 12 has a groove 121 on an inward side thereof, which communicates with the groove 111 of the rim 11. Furthermore, rear end portions of the grooves 121 of the temples 12 have a larger thickness and a larger width than the other portions of the grooves 121.

The light emitting device 13 includes several light emitting elements 131, and a power supplying unit 132 electrically connected to the light emitting elements 131 for supplying power to the light emitting elements 131. The light emitting elements 131 can be EL sheets, EL wires or light emitting diodes.

In assembly, the light emitting elements 131 are positioned in the grooves 111 and 121 of the rim 11 and the temples 12, and the power supplying unit 132 is fitted in one of the rear end portions of the grooves 121. Therefore, light will be emitted from the eyeglasses 1.

Figure 3:
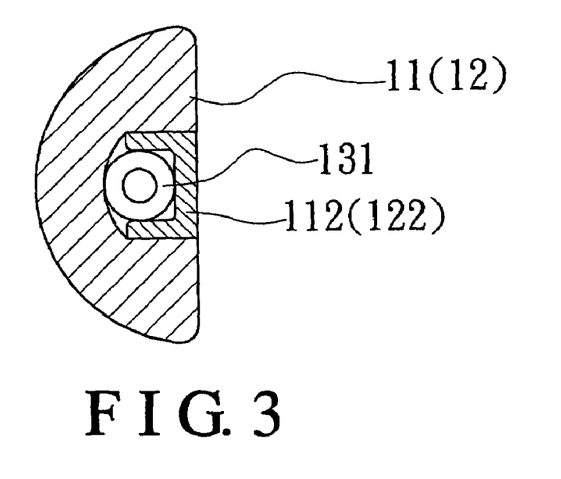
FIG. 3 is a vertical sectional view of the second embodiment in the present invention.

Referring to FIG. 3, the eyeglasses 1 further has transparent covers 112, 122, which are respectively fitted in the grooves 111, 121 of the rim 11 and the temples 12 to cover and protect the light emitting elements 131.

Figure 4:
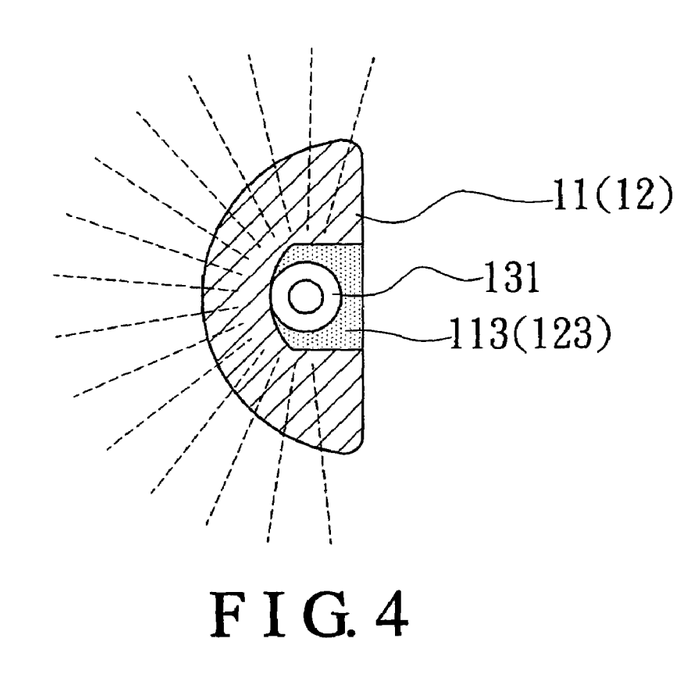
FIG. 4 is a vertical sectional view of the third embodiment.
Figure 5:
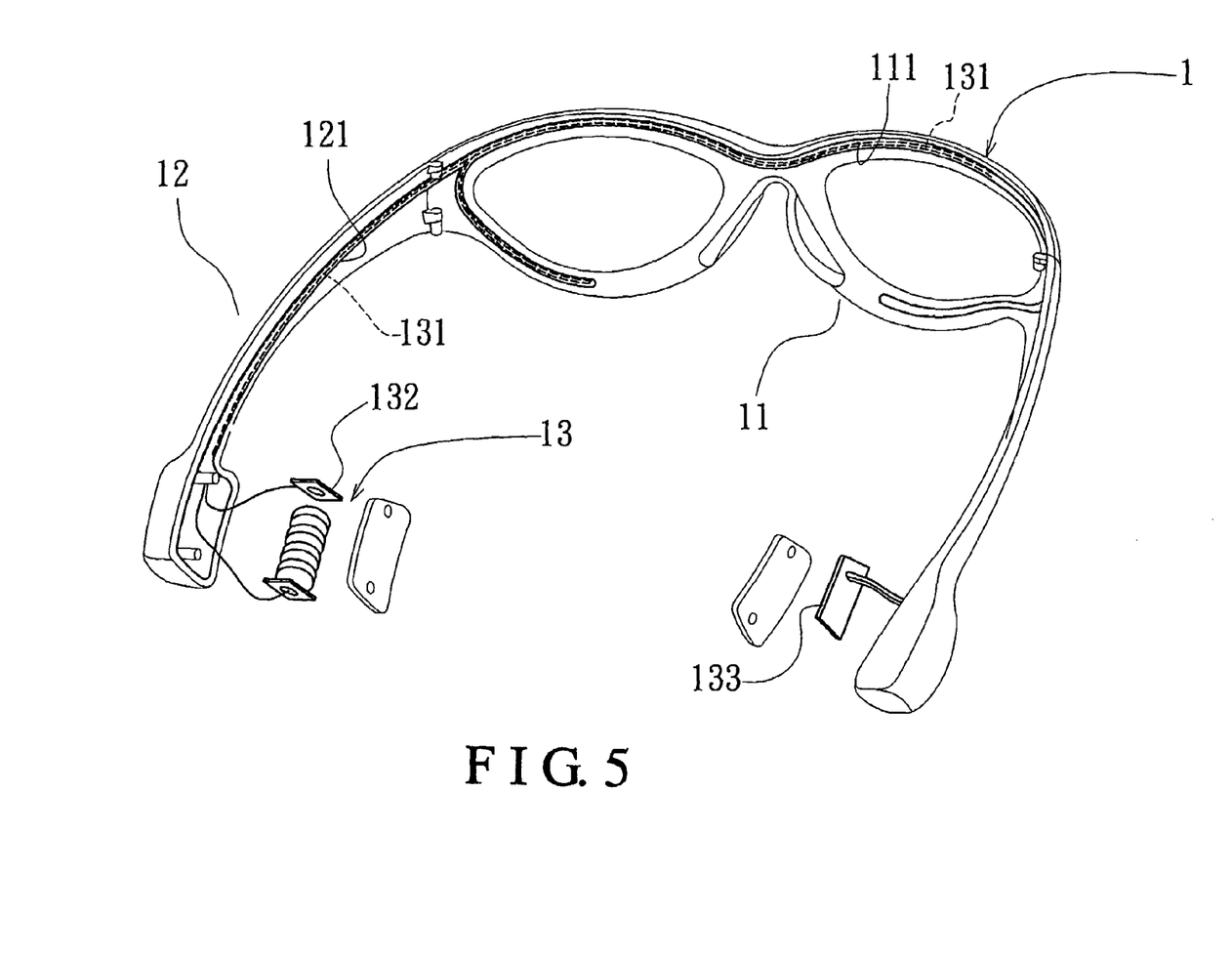
FIG. 5 is a view of the fourth embodiment in the present invention.
Figure 6:
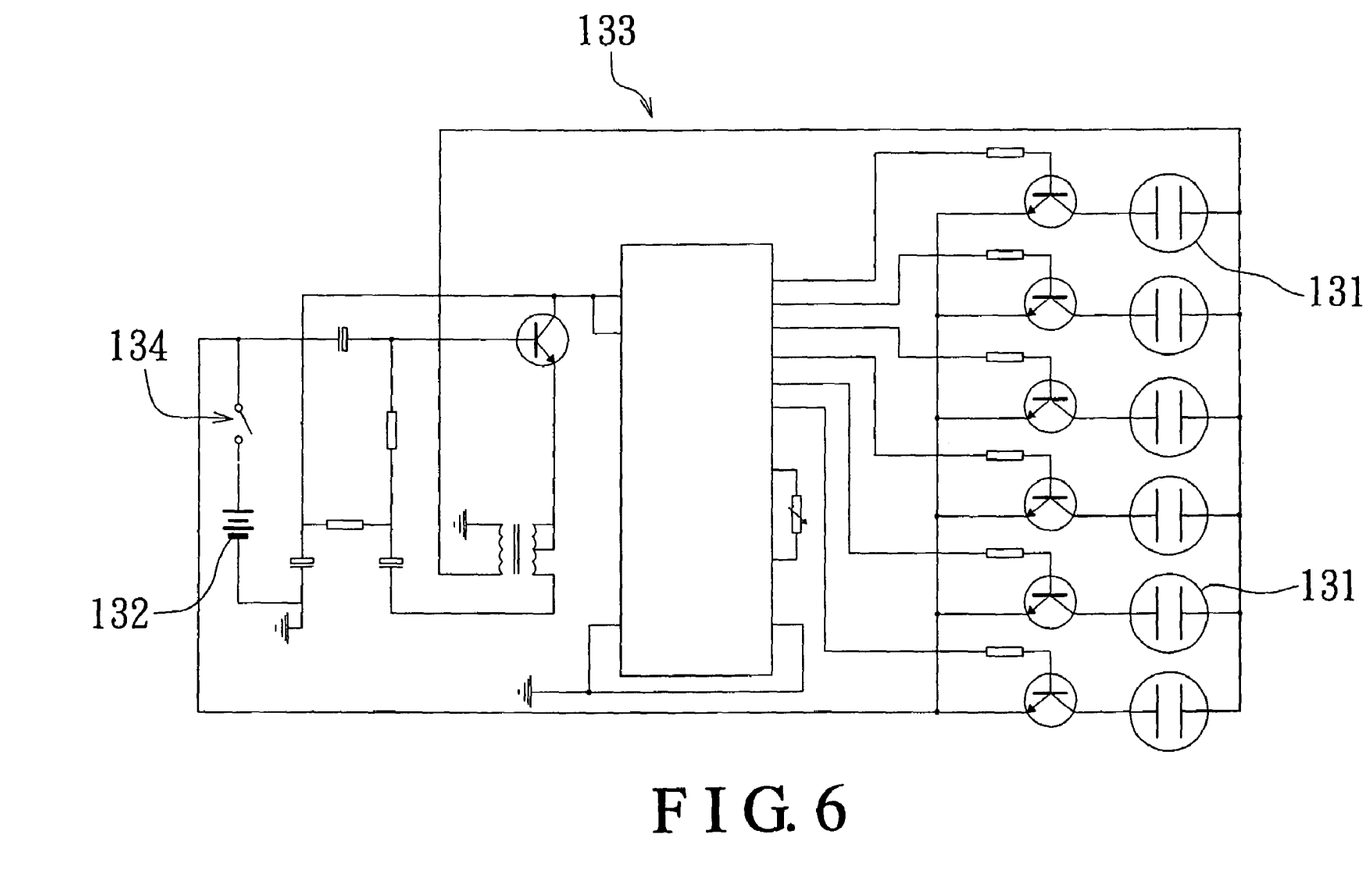
FIG. 6 is a circuit diagram of the circuit control unit of the eyeglasses of the present invention (1)
Figure 7:
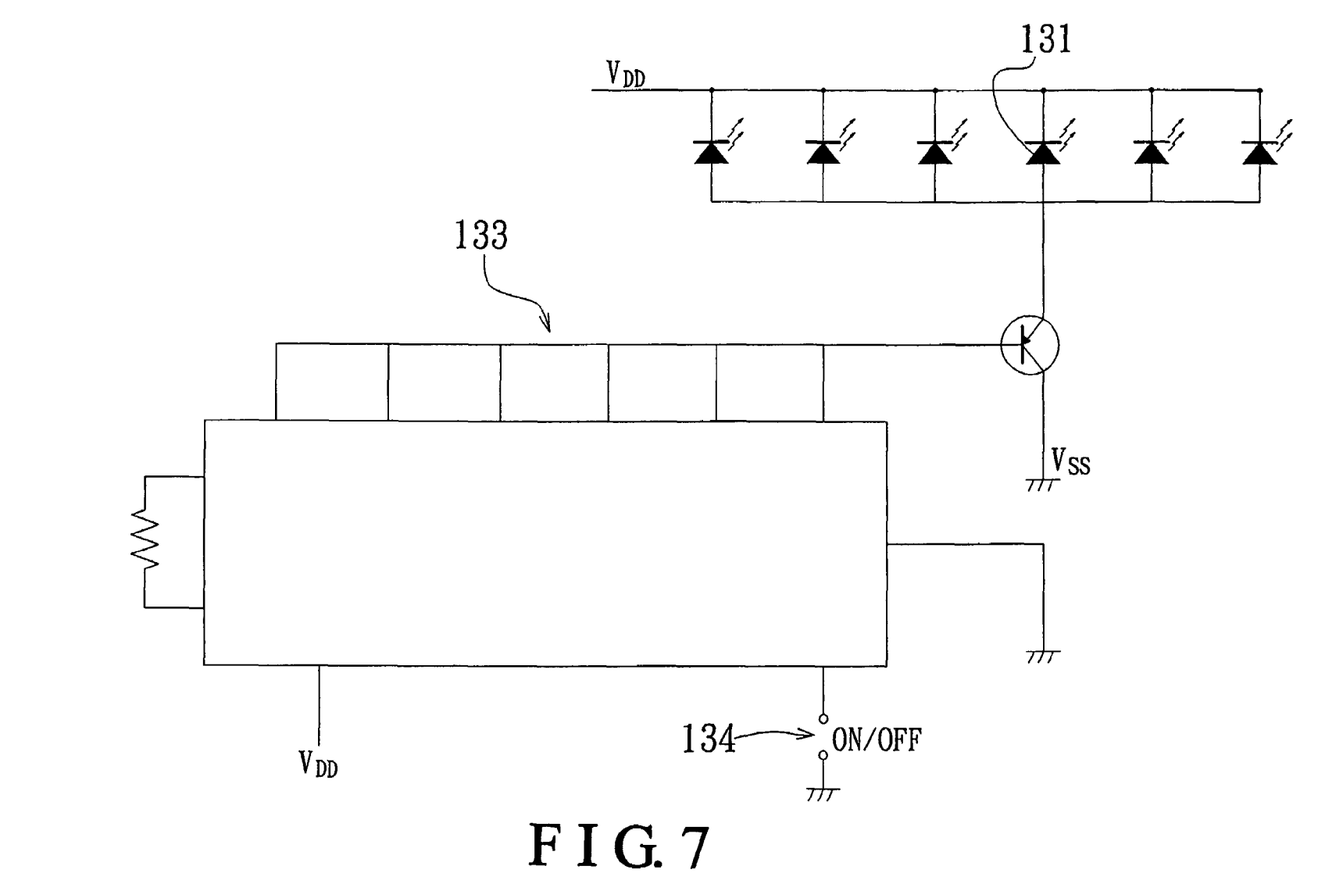
FIG. 7 is a circuit diagram of the circuit control unit (2)
Figure 8:
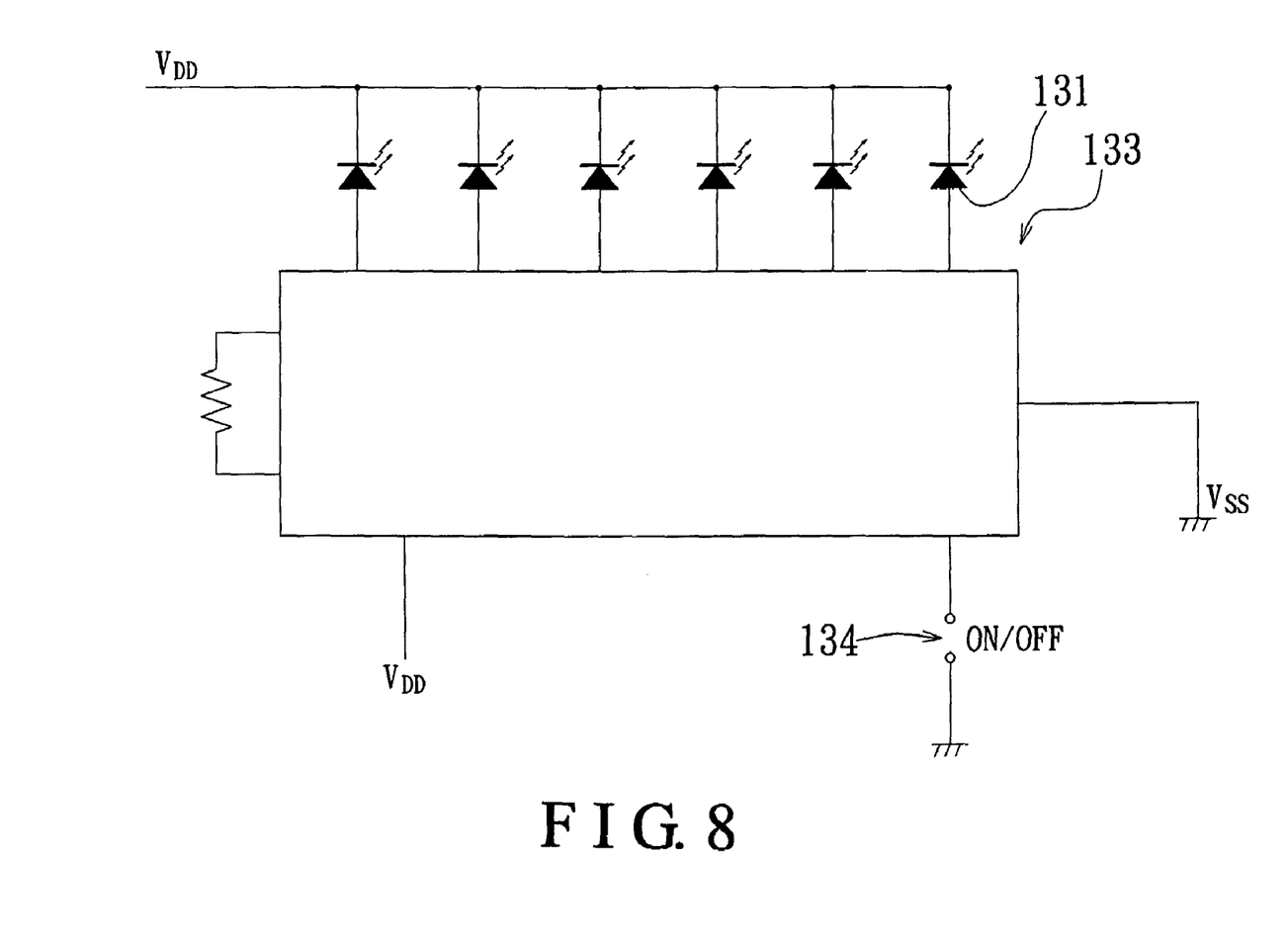
FIG. 8 is a circuit diagram of the circuit control unit (3)

Alternatively, referring to FIG. 4, the grooves 111, 121 of the rim 11 and the temples 12 is further filled with transparent glue 113, 123; thus, the light emitting elements 131 are covered with and protected by the transparent glue 113, 123.

Referring to FIGS. 5 to 8, the light emitting device 13 further has a circuit control unit 133, which includes a control IC, resistors, transistors, and an exterior switch 134. The circuit control unit 133 is electrically connected to the light emitting elements 131 as well as the power supplying unit 132 for controlling the light emitting elements 131. The exterior switch 134 is used for switching the circuit control unit 133 to a selected one of several different mode options. For example, the circuit control unit 133 will make the light emitting elements 131 shine continuously when the exterior switch 134 is in a first position, and make the light emitting elements 131 flash repeatedly when the exterior switch 134 is in a second position. And, the wearer of the eyeglasses 1 is allowed to switch the light emitting elements 131 off by means of using the exterior switch 134.

Figure 9:
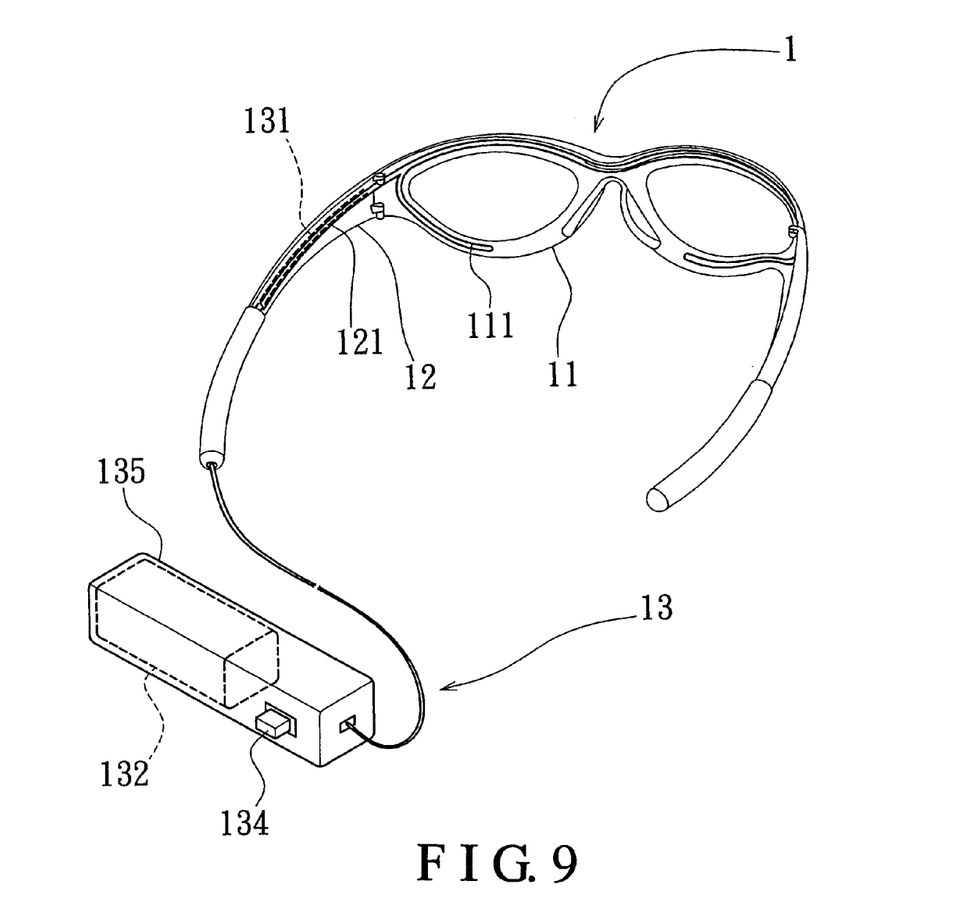
FIG. 9 is a view of the fifth embodiment in the present invention.

Referring to FIG. 9, the power supplying unit 132, the switch 134, and the circuit control unit 133 are arranged outside the eyeglasses 1 instead, and the wires extend outside from one of the rear ends of the temples 12, which wires are used to connect the light emitting elements 11 to the power supplying unit 132 and the circuit control unit 133. Furthermore, the power supplying unit 132 and the circuit control unit 133 are held in a shell 135 while the switch 134 is fitted on the shell 135. Therefore, the power supplying unit 132, the switch 134, and the circuit control unit 133 can be easily carried with the wearer of the eyeglasses 1, and the wearer of the eyeglasses 1 is allowed to make the light emitting elements 131 to shine in a selected one of various ways, and is allowed to switch the light emitting elements 131 off.

Alternatively, the light emitting device 13 only has the switch 134, and it doesn't have the circuit control unit 133; thus, the user is allowed to switch on and switch off the light emitting elements 131.

From the above description, it can be easily understood that the eyeglasses of the invention will shine to look more attractive while serving their major functions, and consumers have additional choices.

What is claimed is:

1. A pair of eyeglasses having a light emitting function, comprising:
    a pair of lenses;
    a rim framing said pair of lenses, the rim having a groove formed therein and extending therealong in surrounding relationship with said pair of lenses;
    two temples, each temple being pivotally connected to a respective one of two ends of the rim, said each temple having a groove formed therein; and
    a light emitting device including:
        (a) a plurality of light emitting elements installed in the grooves of the rim and the two temples, at least a portion of said plurality of light emitting elements surrounding said pair of lenses,
        (b) transparent covers fitted in the grooves of the rim and the two temples to cover said plurality of light emitting elements; and
        (c) a power supplying unit, the power supplying unit being electrically connected to said plurality of light emitting elements for supplying power to illuminate said plurality of light emitting elements.

2. The eyeglasses having light emitting function as claimed in claim 1, wherein the light emitting device further includes a circuit control unit, having an exterior switch and electrically connected to said plurality of light emitting elements and the power supplying unit.

3. The eyeglasses having light emitting function as claimed in claim 1, wherein the light emitting device further has a circuit control unit electrically connected to said plurality of light emitting elements and the power supplying unit for controlling the plurality of light emitting elements; the circuit control unit having an exterior switch for switching the circuit control unit to one of a plurality of different mode options; said plurality of light emitting elements shining continuously when the exterior switch of the circuit control unit is in a first position; and said plurality of light emitting elements flashing repeatedly when the exterior switch is in a second position.

4. The eyeglasses having light emitting function as claimed in claim 1, wherein said plurality of light emitting elements includes EL luminescent units.

5. The eyeglasses having light emitting function as claimed in claim 1, wherein said plurality of light emitting elements includes light emitting diodes.

6. The eyeglasses having light emitting function as claimed in claim 1, wherein the power supplying unit of the light emitting device is held in a shell outside the two temples and the rim.

7. The eyeglasses having light emitting function as claimed in claim 6, wherein the light emitting device further has a circuit control unit held in the shell, said circuit control unit being electrically connected to said plurality of light emitting elements and the power supplying unit; the circuit control unit having an exterior switch on the shell.

8. The eyeglasses having light emitting function as claimed in claim 6, wherein the light emitting device further has a circuit control unit held in the shell; the circuit control unit being electrically connected to said plurality of light emitting elements and the power supplying unit for controlling said plurality of light emitting elements; the circuit control unit having an exterior switch for switching the circuit control unit to one of a plurality of different mode options; said plurality of light emitting elements shining continuously when the exterior switch of the circuit control unit is in a first position; and said plurality of light emitting elements flashing repeatedly when the exterior switch is in a second position.

9. A pair of eyeglasses having a light emitting function, comprising:
    a pair of lenses;
    a rim framing said pair of lenses, the rim having a groove formed therein and extending therealong in surrounding relationship with said pair of lenses;
    two temples, each temple being pivotally connected to a respective one of two ends of the rim, said each temple having a groove formed therein in communication with said groove formed in said rim; and
    a light emitting device including:
        (a) a plurality of lightemitting elements, installed in the grooves of the rim and the two temples, at least a portion of said plurality of light emitting elements surrounding said pair of lenses;
        (b) a transparent glue filling the grooves of the rim and the two temples to cover and protect said plurality of light emitting elements installed therein; and
        (c) a power supplying unit, the power supplying unit being electrically connected to said plurality of light emitting elements for supplying power to illuminate said plurality of light emitting elements.

* * * * *